United States Patent [19]

Easterly

[11] 4,291,959
[45] Sep. 29, 1981

[54] PHOTOGRAPHIC APPARATUS

[75] Inventor: Donald O. Easterly, Rush, N.Y.

[73] Assignee: Eastman Kodak Company, Rochester, N.Y.

[21] Appl. No.: 209,349

[22] Filed: Nov. 21, 1980

[51] Int. Cl.³ .................. G03B 7/085; G03B 7/087; G03B 7/18; G03B 15/05
[52] U.S. Cl. ..................................... 354/31; 354/33; 354/42; 354/59
[58] Field of Search .................. 354/31, 33, 42, 59

[56] References Cited

U.S. PATENT DOCUMENTS

| 3,748,974 | 7/1973 | Cochran | 354/31 X |
| 4,074,287 | 2/1978 | Iwata et al. | 354/31 |
| 4,172,644 | 10/1979 | Wagner et al. | 354/31 |

Primary Examiner—Michael L. Gellner
Attorney, Agent, or Firm—Douglas I. Hague

[57] ABSTRACT

A camera and flash exposure control apparatus varies the ratio of ambient to fill-in flash exposure light as a function of the size of the camera's exposure aperture.

5 Claims, 9 Drawing Figures

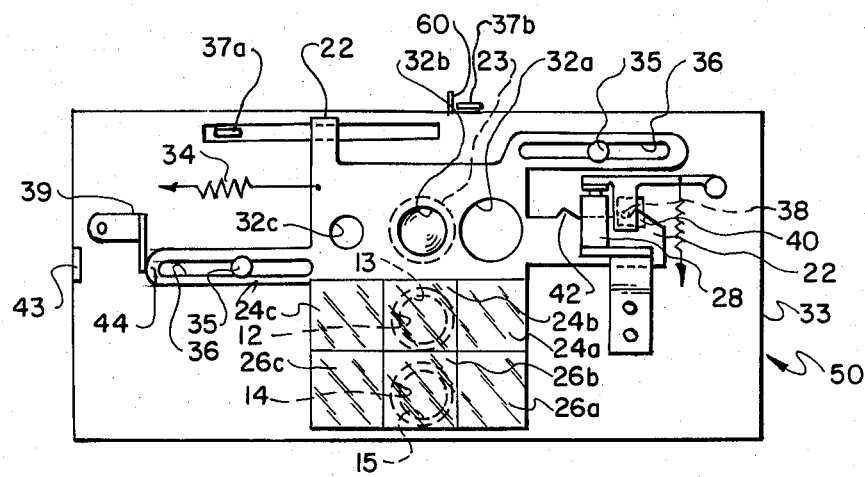
FIG.8
FIG.9
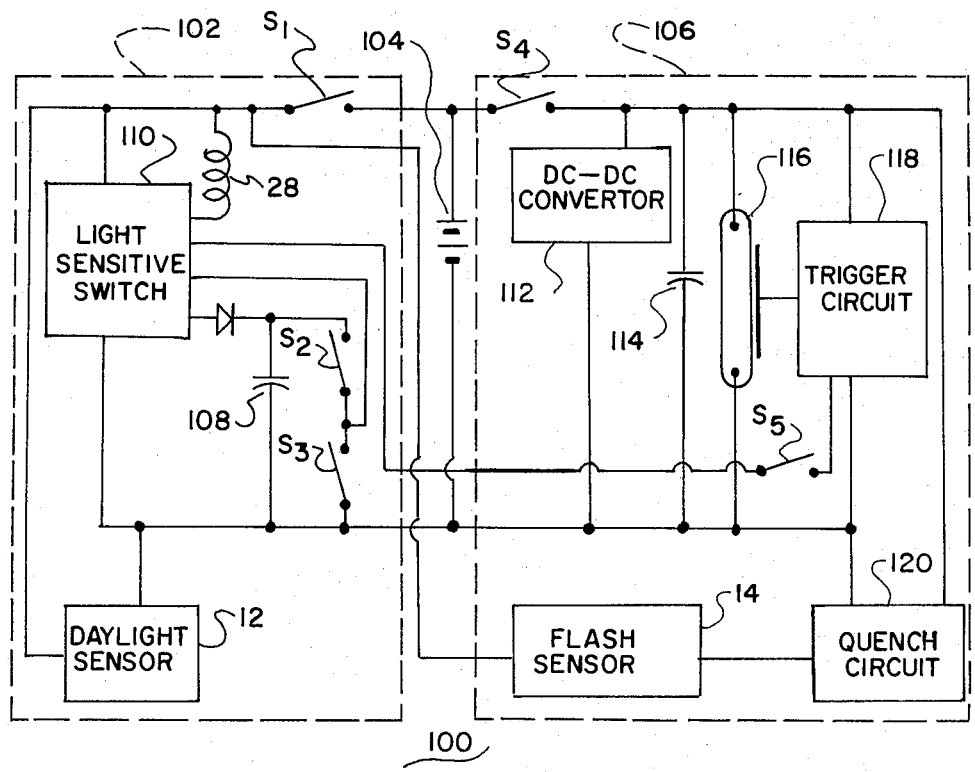

PHOTOGRAPHIC APPARATUS

FIELD OF THE INVENTION

The present invention relates to photographic apparatus and, more particularly, to camera and flash exposure control apparatus for filling in, with flash illumination, the shadows of a photographic subject illuminated by ambient light.

DESCRIPTION OF THE BACKGROUND ART

When taking a photograph at high levels of ambient light, it is often desirable to use a source of artificial illumination, such as a flash bulb or electronic strobe flash unit, to provide supplementary light to the shaded portions of a photographic subject. When a source of artificial illumination is used in high ambient light, the camera and flash apparatus are operated in a mode commonly referred to as "fill-in flash". In fill-in flash applications, the supplementary light should lighten the shadows but not eliminate them. Proper film exposure thus requires apparatus that measures the amounts of flash light and ambient light and terminates the flash light and ambient light exposures when an appropriate ratio of ambient light to flash light has been provided.

U.S. Pat. No. 3,509,422 to Kilgore discloses a photoflash lighting circuit which automatically provides an exposure having a constant ratio of ambient light to flash light. The circuit includes two photoelectric detectors for detecting and producing signals representative of the ambient light intensity and the reflected flash illumination, respectively, and a differential amplifier for detecting the difference between these signals to provide a signal that quenches the generation of light by the flashtube when a predetermined quantity of light energy from the flashtube has been reflected. However, for the best photographic effect, the ratio of ambient light to flash light should be changed for different scene contrasts. For example, in high contrast scenes having some portions brightly illuminated and other portions relatively dark, a three-to-one (ambient to flash) lighting ratio may be most appropriate where as in low ("flat") contrast scenes a six-to-one lighting ratio may be most appropriate.

SUMMARY OF THE INVENTION

The present invention provides a simple yet thoroughly reliable and efficient camera and flash exposure control apparatus that changes the ambient to flash lighting ratio to any desired value as a function of the scene lighting conditions. This is accomplished by exposure control apparatus which changes, in a first sequence as a function of the diaphragm setting, the amounts of ambient light transmitted to a first light sensor forming part of an ambient light exposure control circuit. Concurrently, the amounts of flash light transmitted to a second light sensor forming part of the quench circuit for the flashtube of an electronic flash unit are changed in a second, non-corresponding sequence as a function of the diaphragm setting. The different fractional amounts of incident ambient and flash light transmitted to the first and second sensors, respectively, causes the ratio of ambient exposure light to flash exposure light to vary in accordance with the size of the selected exposure aperture.

In a preferred embodiment of the invention, first and second series of neutral density filters are attached to a movable diaphragm blade having a plurality of different size exposure apertures. The movement of the diaphragm blade causes the first series of filters to pass in front of a first light sensor connectable into a control circuit that closes the camera shutter after a predetermined quantity of ambient light has been transmitted to the film. The diaphragm blade movement causes the second series of filters to pass in front of a second light sensor connectable into the quench circuit of an electronic flash unit that terminates the emission of flash light from a flashtube after a predetermined quantity of flash light has been transmitted to the film. The amounts of incident light transmitted to the first light sensor by the first series of filters are different from the amounts of incident light transmitted to the second light sensor by the corresponding filters in the second series. Accordingly, a different ambient to flash lighting ratio is provided for each exposure aperture provided by the diaphragm blade.

The invention and its objects and advantages will become more apparent by referring to the accompanying drawings and to the ensuing detailed description of the preferred embodiment.

BRIEF DESCRIPTION OF THE DRAWINGS

FIG. 8 is a front view similar to FIG. 3 but showing the setting of the diaphragm blade in low ambient light when the flash unit is turned on; and FIG. 9 shows in partly schematic and partly box form, an electric circuit suitable for use with the apparatus of FIGS. 1 and 2.

DETAILED DESCRIPTION OF THE PREFERRED EMBODIMENT

Because photographic camera and electronic flash apparatus are well known, the present invention will be directed in particular to elements forming part of, or cooperating more directly with, the present invention. It is to be understood that camera and flash elements not specifically shown or described herein may be selected from those known in the art.

Figure 1:
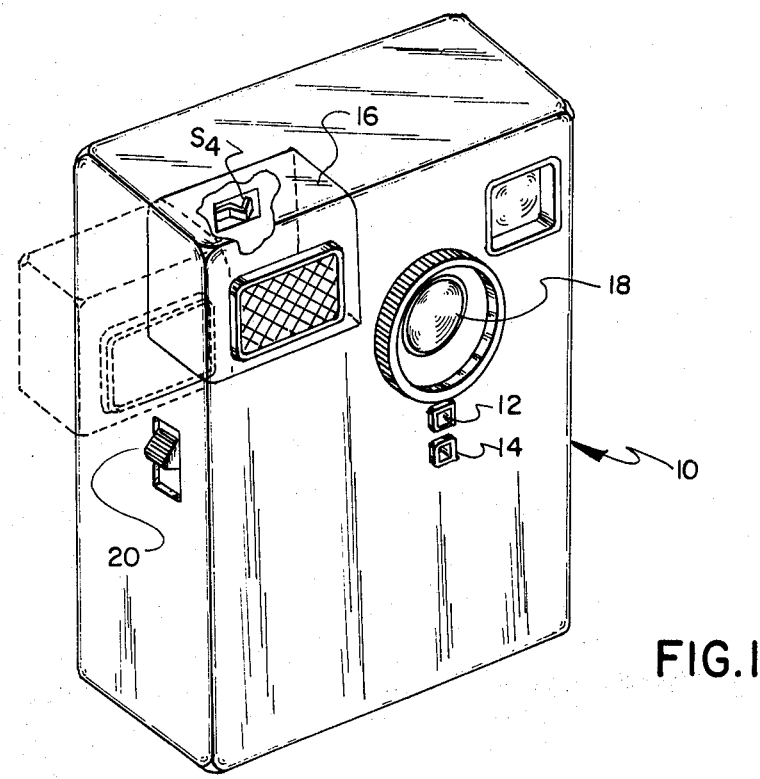
FIG. 1 is a front perspective view of a photographic camera incorporating the exposure control apparatus of the present invention.
Figure 3:
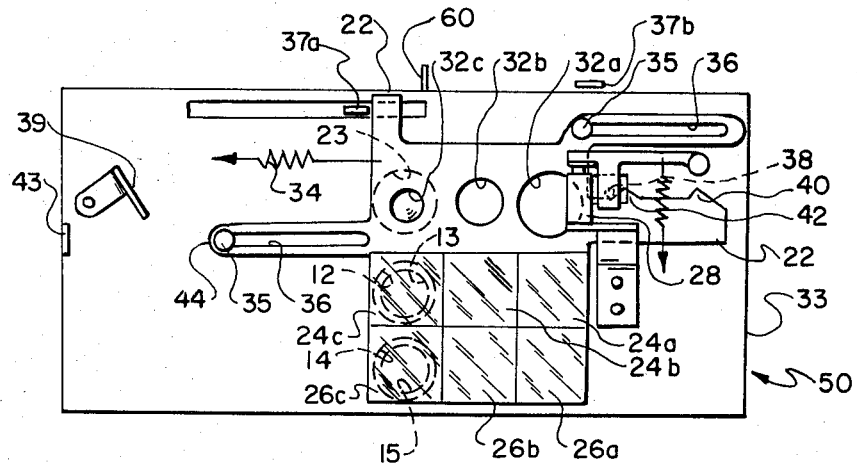
FIGS. 3 and 4 are front and rear views, respectively, showing the exposure control apparatus of FIG. 2 in its cocked position prior to the initiation of an exposure.
Figure 2:
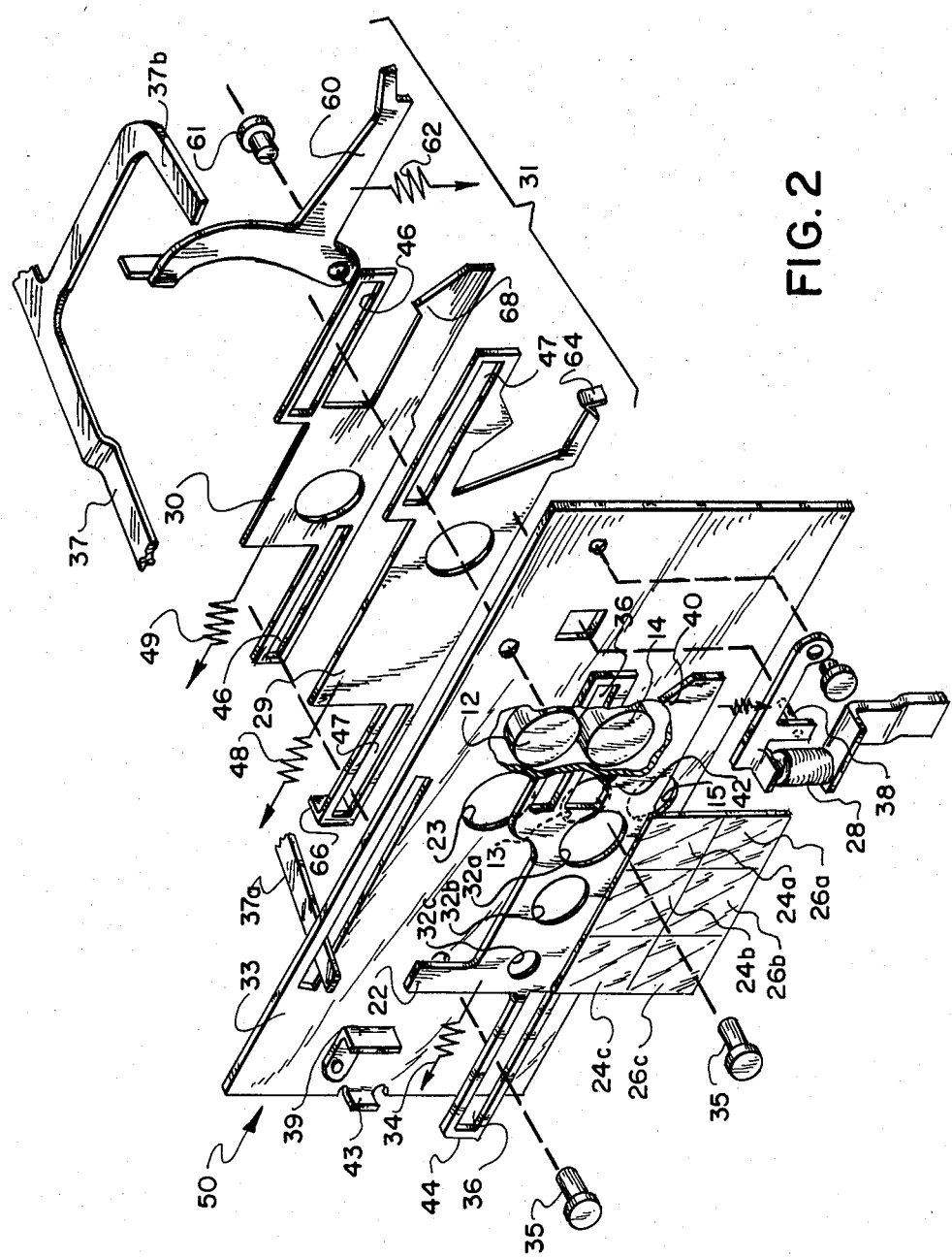
FIG. 2 is an exploded view of exposure control apparatus constructed in accordance with the teachings of the invention.

Referring now to the drawings there is shown in FIG. 1 a photographic camera 10 having an ambient light sensor 12, a flash light sensor 14, an electronic strobe flash unit 16, a lens 18 and a shutter release 20. In accordance with the present invention, the camera is provided with apparatus 50 shown in FIG. 2 and circuitry 100 shown in FIG. 9 for controlling the exposure of film received in the camera in a manner so that the ratio of natural, ambient light (such as sun light) to artificial, flash light varies as the function of the setting of the camera's exposure aperture. Basically, the apparatus 50 in cooperation with the circuit 100, automatically adjusts the position of a diaphragm blade 22, movable relative to an exposure aperture 23 provided in a mounting plate 33, to provide one of a plurality of different size exposure apertures in accordance with the intensity of the ambient light illuminating the scene to be photographed. In the course of adjusting the position of the diaphragm blade 22, an attached first series of neutral density filters 24 passes in front of the ambient light sensor 12 located behind mounting plate aperture 13, and an attached second series of corresponding neutral density filters 26 passes in front of the flash light sensor 14 located behind mounting plate aperture 15. Upon completion of the selection of the appropriate exposure aperture, the exposure control circuit 100 operates in a timing mode to (1) terminate the light emission from the electronic strobe flash unit 16 when the flash light sensor 14 has sensed a predetermined amount of flash light reflected from a photographic subject (not shown) and (2) to cause an electromagnet 28 to close a shutter mechanism 31 to thereby terminate an exposure interval when the daylight sensor 12 has sensed a predetermined amount of ambient scene light reflected from the subject. Different fractional amounts of the incident ambient scene light and flash light are transmitted by the filters 24 and 26 onto the ambient light sensor 12 and the flashlight sensor 14, respectively, because the fractional light transmission versus diaphragm blade position relationship of the first series of filters differs from the fractional light transmission versus diaphragm blade position relationship of the second series of filters. Consequently, the light transmission control/diaphragm blade position arrangement of the present invention provides a different ratio of ambient to fill-in flash exposure light for each and every exposure aperture provided by the diaphragm blade 22. Lower ratios of ambient to fill-in flash exposure light are provided at the smaller camera apertures where the ambient scene illumination is high and the scene contrast is, therefore, also likely to be high. Higher ratios of ambient to fill-in flash exposure light are provided at the larger camera apertures where the ambient scene illumination is low and the scene contrast is likely to be low ("flat").

In the specific embodiment shown in FIGS. 2 through 8, the diaphragm blade 22 is provided with three exposure apertures 32a, 32b, and 32c, the sizes of which are f12.8, f18 and f30, respectively. Attached to the diaphragm blade 22 at a position underlying the exposure aperture 32a are a pair of neutral density filters 24a and 26a, respectively. The densities of the filters 24a and 26a are 0 and 0.3, respectively. Similarly, a pair of neutral density filters 24b and 26b are attached to the diaphragm blade 22 at a position underlying the exposure aperture 32b and a pair of neutral density filters 24c and 26c are attached to the diaphragm blade 22 at a position underlying the exposure aperture 32c. The densities of the filters 24b, 24c, 26b, and 26c are 0.7, 1.1, 0 and 0.5, respectively.

The diaphragm blade 22 is mounted on the front side of the mounting plate 33 by a pair of pins 35 which cooperate with a pair of slots 36 provided in the blade 22. The blade 22 is biased by a spring 34, having one end connected to the plate 33 and the opposite end connected to the blade 22, for sliding movement from left to right as shown in the drawings, but is normally held in a latched position by a bifurcated pivotable control member 37 which is coupled (by means not shown) to the shutter release 20. When the camera operator depresses the shutter release 20 to initiate a photographic cycle, the control member 37 is released, prior to shutter opening, for pivotable movement in a clockwise direction. The diaphragm blade 22 follows the control member arm 37a under the urging of the spring 34 and slides from left to right along with the attached neutral density filters 24 and 26. In the initial, latched position of the diaphragm blade 22 shown in FIG. 3, the filter 24c is located in front of the ambient light sensor 12, the filter 26c is located in front of the flash light sensor 14 and the aperture 32c is aligned with the mounting plate exposure aperture 23 and the camera picture taking lens 18. As described hereinbelow, the diaphragm blade 22 is clamped in its initial position at high ambient light levels by energization of the electromagnet 28. At lower ambient light levels the electromagnet 28 is initially de-energized. This permits the diaphragm blade 22 to move along its path of travel under the urging of spring 34. As the diaphragm blade 22 moves along its path of travel, the filters 24b and 24a are successively located in front of the sensor 12, the filters 26b and 26a are successively located in front of the sensor 14 and the apertures 32b and 32a are successively aligned with the picture taking lens 18. The circuit 100 controls the selection of the aperture 32b or 32a by controlling the time of energization of the electromagnet 28. The filters 24 and 26 are mounted off center with respect to the apertures 32 to allow for sufficient time for the circuit 100 to determine the proper aperture size with respect to ambient conditions prior to the opening of the shutter 31.

Upon completion of the exposure aperture size determination, the circuit 100 operates to independently control the duration of (1) the ambient light exposure interval and (2) the flash light exposure interval.

Referring now to FIG. 9, the exposure control circuit 100 generally comprises an aperture size control and ambient light exposure duration control circuit 102, a battery 104 and a flash light exposure duration control circuit 106.

The aperture size control and ambient light exposure duration control circuit 102, which includes the ambient light sensor 12, the electromagnet 28, switches $S_1$, $S_2$, $S_3$, an integrating capacitor 108, and a light sensitive switch 110, controls the state of the electromagnet 28 and ultimately controls the setting of the diaphragm blade 22 and the closure of the shutter 31. The flash light exposure duration control circuit 106 includes the flash light sensor 14, a DC-DC converter 112, a capacitor 114, a flash lamp 116, a trigger circuit 118, a quench circuit 120, and switches $S_4$, and $S_5$, and controls the duration of the flash light emission produced by the flash unit 16.

The aperture size control and ambient light exposure duration control circuit 102 first operates to control the adjustment of the diaphragm blade 22 and then to control the duration of the ambient light exposure interval. When the camera operator trips the shutter release 20, the shutter release moves downwardly against the restoring force of a spring (not shown). During the initial downward movement, the switch $S_1$ is closed to energize the light sensitive switch 110. At this position in the movement of the shutter release 20, switch $S_1$ is closed, switch $S_2$ is open and switch $S_3$ is closed. A predetermined fraction of the reflected ambient scene light (the fraction being dependent upon the density of the particular filter 24a, 24b, or 24c that is positioned in front of the sensor 12) is transmitted onto the ambient light sensor 12. The ambient light sensor 12 receives the transmitted fractional light, generates a current related to the ambient scene brightness and applies such a current to the light sensitive switch 110. The light sensitive switch 110 itself forms no part of the present invention and accordingly will be described in the present specification generally. A light sensitive switch suitable for use in the present invention is disclosed in commonly assigned U.S. Pat. No. 4,037,237 issued July 19, 1977, to Robert J. Maigret and reference should be made thereto if detailed information is required. In the aperture size control mode of operation of the circuit 102, the light sensitive switch 110 provides a reference current proportional to a predetermined scene brightness which is compared to the photocurrent produced by the ambient light sensor 12. When the photocurrent is greater than the reference current, the light sensitive switch 110 energizes the electromagnet 28. The energization of the electromagnet 28 stops the diaphragm blade 22 by bringing a holding latch 38 into engagement with one of two blade protuberances 40 or 42, corresponding respectively to the apertures 32b or 32c, respectively.

In the illustrative embodiment showing the drawings, the camera 10 has an f:12.8, 100 mm lens 18 with the following focus limits:

a. 3.5 ft. to 14 ft. at f:12.8
b. 3.5 ft. to infinity at f:18
c. 3.0 ft. to infinity at f:30, and a maximum shutter speed of 1/300 of a second. The electromagnet 28 operates in this embodiment under the following conditions as directed by the light sensitive switch 110:

1. At ambient light levels greater than 150 foot-lamberts the electromagnet 28 is energized immediately and the latch 38 engages protuberance 42 clamping the diaphragm blade 22 at the f:30 aperture 32c.

2. At ambient light levels between 150 foot-lamberts and 50 foot-lamberts the electromagnet 28 is not energized until the filter 24b is positioned in front of the daylight sensor 12. This causes the latch 38 to engage the blade protuberance 40 and clamp the diaphragm blade 22 at the f:18 aperture 32b.

3. At ambient light levels below 50 foot-lamberts with the electronic flash unit 16 turned off, the electromagnet 28 remains de-energized, a low light indicator (not shown) is activated and a flash defeat button 39 is moved downwardly so that it engages a diaphragm blade projection 44, stopping the diaphragm blade 22 in a position at which the f:18 aperture is aligned with the lens 18. (See FIG. 8.)

4. At ambient light levels below 50 foot-lamberts with the electronic flash unit 16 turned on, the electromagnet 28 remains de-energized, the flash defeat button is moved upwardly and the diaphragm blade advances until the blade projection 44 engages a frame stop 43 provided on the mounting plate 33, aligning the f:12.8 aperture with the picture taking lens 18. (See FIG. 7.)

Upon completion of the exposure aperture size determination, the switch $S_2$ is closed in preparation for shutter timing by further downward movement of the shutter release 20. Because the switch $S_3$ is series connected with switch $S_2$, the closure of $S_2$ shunts the capacitor 108 to ground. The capacitor is thus discharged before the start of the shutter timing operation. When the capacitor 108 is discharged, the electromagnet 28 is energized, if it had previously remained de-energized to increase the effective size of the exposure aperture 23.

Figure 4:
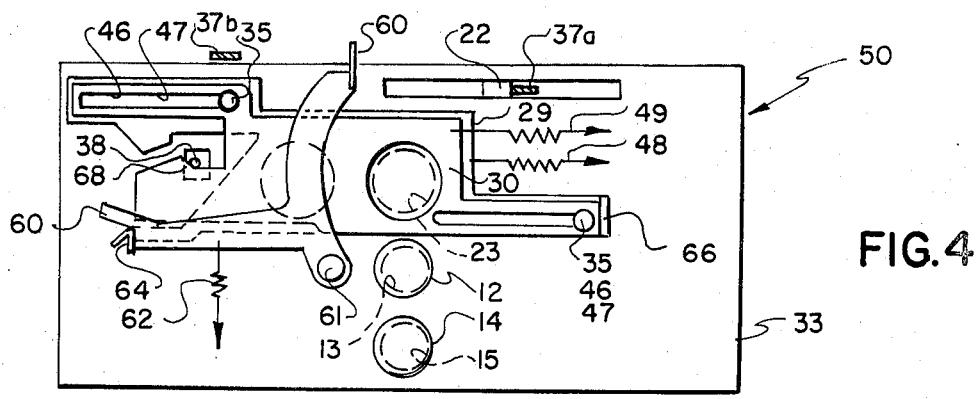
Figure 5:
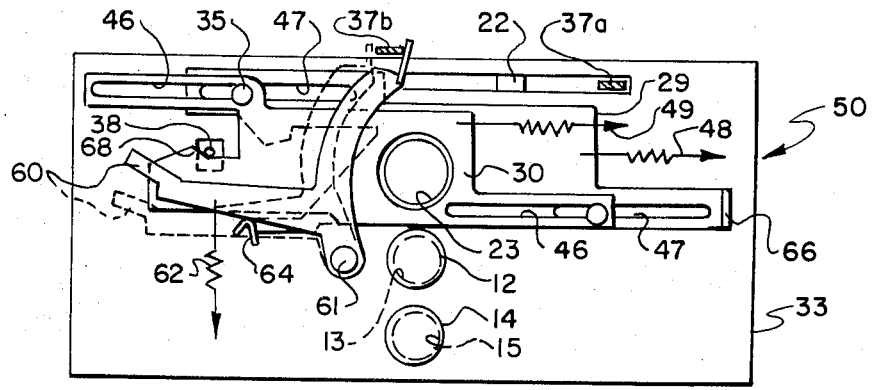
FIG. 5 is a rear view similar to FIG. 4 but showing the exposure control apparatus in its shutter open position.
Figure 6:
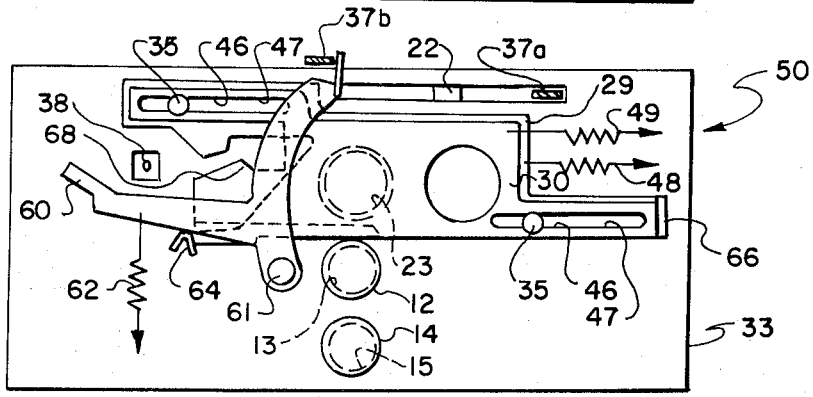
FIG. 6 is a rear view similar to FIG. 4 but showing the exposure control apparatus in its shutter closed position.
Figure 7:
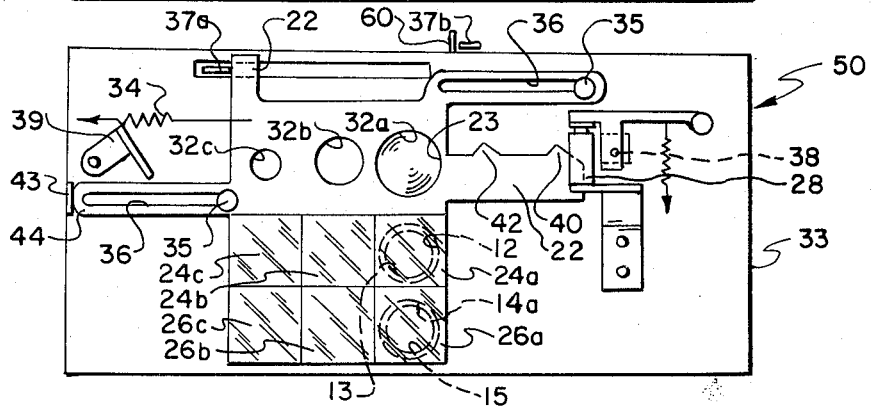
FIG. 7 is a front view similar to FIG. 3 but showing the setting of the diaphragm blade in low-ambient light when the flash unit is turned off.

To effect an exposure, a latch lever 60 is pivoted counterclockwise about pivot 61 by control member arm 37b as shown in FIG. 5 to release the shutter mechanism 31. The shutter mechanism 31 is a conventional two-blade system, which is shown in FIG. 4 in its "cocked" position preparatory to actuation to effect an exposure. The shutter mechanism includes a pair of shutter blades 29 and 30 which are slidably mounted upon the mounting plate 33 by means of the pins 35 and slots 46 and 47, respectively, for movement relative to the exposure aperture 23. When the blade 29, which is the "opening" blade in this embodiment, is in its cocked position, it is retained against the bias of a spring 48 by the latch lever 60 which is biased by a spring 62 into latching engagement with an ear 64 provided on the blade 29. The opening blade has a second ear 66 positioned to engage and hold the blade 30, which in this embodiment is the "closing" blade, in its cocked position against the bias of a spring 49. In their respective cocked positions, opening blade 29 is retained in a covering relationship with respect to the exposure aperture 23 and closing blade 30 is retained in an uncovering relationship with respect to the exposure aperture. When the blades are in their respective cocked positions, the spring 48 urges the opening blade 29 to an uncovering position with respect to the exposure aperture 23 and the spring 49 urges the closing blade 30 to a covering position overlying the exposure aperture.

When the latch lever 60 is rotated out of engagement with the ear 64 on the opening blade 29, the blade 29 is released for movement under the influence of spring 48 to an uncovering position with respect to the exposure aperture 23 to thereby initiate an exposure interval. When the opening blade 29 moves away from its cocked position, it moves out of engagement with one of the contacts of a normally closed switch $S_3$, thereby causing that switch to open. The movement of opening blade 29 away from its cocked position also moves ear 66 out of engagement with the closing blade 30. Closing blade 30 is, however, retained in its cocked position by the holding latch 38 of energized electromagnet 28 which engages a protuberance 68 provided on the blade 30.

When the switch $S_3$ is open, a charge is developed on the capacitor 108 by the photocurrent from the ambient light sensor 12. After an interval of time related to the ambient scene brightness the voltage on the capacitor 108 exceeds that of a reference voltage provided by the light sensitive switch 110. The light sensitive switch 110 then de-energizes the electromagnet 28 which allows the closing blade 30, under the urging of spring 49, to cam the holding latch 38 upwardly, via protuberance 68, and then to move to a covering position overlying the exposure aperture. De-energization of the electromagnet 28, also releases the diaphragm blade 22 if the blade 22 is held in either the f:30 or f:18 aperture positions. However, the shutter blade 30 closes before the diaphragm blade 22 begins to move.

The flash light exposure duration control circuit 106 operates as follows. The switch $S_4$ is closed to energize the circuit 106 by moving the flash unit 16 to the operative position shown in dotted lines in FIG. 1. When the circuit 106 is energized the capacitor 114 is charged by the converter 112. The movement of the flash unit 16 to its operative position also causes the flash defeat button 39 to move upwardly to a position out of the path of movement of the blade projection 44.

After the completion of the exposure aperture size determination the switch $S_5$ is closed during further downward movement of the shutter release 20. When the switch $S_5$ is closed the light sensitive switch 110 sends a command signal to the trigger circuit 118 to trigger the flashtube 116. The capacitor 114 then begins to discharge through the flashtube. The flash light sensor 14 receives a fractional portion of the flash light incident on the filter 26a, 26b or 26c aligned therewith and supplies a current to the quench circuit 120 that is related to the intensity of such flash illumination. When the total amount of flash light received by the sensor 14 reaches a predetermined value the quench circuit 120 interrupts the discharge of the capacitor 114. This action in turn causes the termination of the light emission from the flashtube 116.

In accordance with the present invention, the densities of the two series of filters 24a, 24b, and 24c and 26a, 26b, and 26c are chosen so that the variation in the fraction of incident ambient scene light transmitted by the filters 24a, 24b and 24c onto the ambient light sensor 12 is not proportional to the variation in the fraction of incident flash light transmitted by the filters 26a, 26b and 26c onto the flash light sensor 14. More particularly, the variation in the fraction of incident ambient scene light transmitted by the filters 24a, 24b and 24c is a single-valued function of the position of the diaphragm blade 22 whereas the fraction of incident flash light transmitted by the filters 26a, 26b, and 26c is a multiple-valued function of the position of the diaphragm blade 22. In the illustrated embodiment, the densities of the filters 24c, 24b, and 24a (1.1, 0.7 and 0, respectively) vary the fraction of incident ambient scene light transmitted onto the ambient light sensor 12 in a sequence that monotonically increases as a function of the position of the diaphragm blade 22. The densities of the filters 26c, 26b, and 26a (0.5, 0 and 0.3) vary the fraction of incident flash light transmitted onto the flash sensor 14 in a sequence that first increases and then decreases as a function of the position of the diaphragm blade 22. The particular filter density values listed provide a three to one ambient to fill-in flash lighting ratio when aperture 32c (f:30) is selected, a five to one ambient to fill-in flash lighting ratio when aperture 32b (f:18) is selected and ambient light supression in excess of one stop in full flash, i.e. when aperture 32a (f:12.8) is selected. If desired by the camera designer, other ambient fill-in flash lighting ratios could be provided by the simple expedient of changing the densities of filters 24a, 24b, 24c and 26a, 26b, and 26c as appropriate.

The invention has been described in detail with particular reference to a preferred embodiment thereof, but it will be understood that variations and modifications can be effected within the spirit and scope of the invention. For example, the number of apertures provided by the diaphragm blade and the corresponding number of different filter elements for the two series of filters can be varied in accordance with the design requirements of the camera. Furthermore, rather than a series of filters the light transmission control means could be provided by an aperture plate having a first series of sensor control apertures and a second series of sensor control apertures, the plate being mounted on the diaphragm blade so that the first series of apertures passes in front of the daylight sensor and the second series of apertures passes in front of the flash light sensor. Different ambient to fill-in flash lighting ratios are provided for each exposure aperture selected by the diaphragm blade by choosing the size of the sensor control apertures and so that the variation in the incident ambient scene light transmitted through the first series of sensor control apertures is not proportional to the variation in the fraction of incident flash light transmitted through the second series of sensor control apertures.

What is claimed is:

1. In a photographic apparatus including:
    adjustable diaphram means providing a plurality of different-size exposure apertures;
    a first light sensor for sensing the ambient light reflected from a photographic subject, and for providing an output indicative of such ambient light;
    means responsive to the output from the first light sensor for adjusting the diaphragm means; and
    an electronic flash unit including a flash producing means for emitting a predetermined amount of flash light toward the photographic subject, a second light sensor for sensing flash light reflected by the subject as a result of flash light transmitted thereto by the electronic flash unit and for providing an output indicative of such flash light, and a quench circuit for terminating the generation of flash light by the flash producing means in response to the output from the second light sensor, the improvement comprising:
    adjustable light control means coupled to the diaphragm means for changing the amounts of incident ambient light transmitted to the first sensor in a first sequence as a function of the diaphragm setting and for changing the amounts of flashlight transmitted to the second light sensor in a second sequence as a function of the diaphragm setting so as to vary the ratio of ambient exposure light to flash exposure light in accordance with the selected exposure aperture.

2. The apparatus according to claim 1 on which said diaphragm means includes a moveable member and wherein said first sequence monotonically increases as a function of the setting of the diaphragm means and said second sequence at least once increases and then decreases as function of the setting of the diaphragm means.

3. In a photographic apparatus including:
    movable diaphragm means providing a plurality of different-size exposure apertures as a function of the position thereof;
    a first light sensor for sensing the ambient light reflected from a photographic subject and for providing an output indicative of such ambient light;
    means responsive to the output from the first light sensor for adjusting the position of the diaphragm means; and
    an electroinc flash unit including a flash producing means for emitting a predetermined amount of flash light toward the photographic subject, a second light sensor for sensing flash light reflected by the subject as a result of flash light transmitted thereto by the electronic flash unit and for providing an output indicative of such flash light and a quench circuit for quenching the generation of flash light by the flash-producing means in response to the output from the second light sensor the improvement comprising:
    light transmission control means for varying the ratio of ambient exposure light to flash exposure light in response to the movement of the diaphragm means, said means comprising a first light attenuating means for transmitting onto the first light sensor a fraction of the incident ambient scene light which varies as a first function of the diaphragm setting and a second light attenuating means for transmitting onto the second light sensor a fraction of the incident flashlight which varies as a second function of the diaphragm setting, the variation in the fraction of incident ambient scene light transmitted by the first light attenuating means being nonproportional to the variation in the fraction of incident flashlight transmitted by the second light attenuating means.

4. The apparatus according to claim 3 wherein each of said first and second light attenuating means includes a plurality of neutral density filters having different transmissions.

5. Apparatus for making photographic exposures, said apparatus comprising in combination a movable diaphragm means providing a plurality of different size exposure apertures as a function of the position thereof;

a shutter movable between open and closed positions;
means for moving the shutter to its open position;
a first light sensor for sensing the ambient light reflected from a photographic subject and for providing an output indicative of such ambient light;
an aperture size control circuit responsive to the output from the first light sensor prior to the opening of the shutter for adjusting the position of the diaphragm means;
an electronic flash unit including a flash producing means for emitting a predetermined amount of flash light toward the photographic subject, a second light sensor for sensing flash light reflected by the subject as a result of flash light transmitted thereto by the electronic flash unit and for providing an output indicative of such flash light and a quench circuit for quenching the generation of light by the flash producing means in response to the output from the second light sensor;
an ambient exposure duration control circuit responsive to the output from the first light sensor upon the opening of the shutter for controlling the closing of the shutter; and
means for varying the ratio of ambient exposure light to flash exposure light in accordance with the setting of the diaphragm means, said means comprising a first adjustable light attenuating means coupled to the diaphragm means for transmitting onto the first light sensor a fraction of the incident ambient light, said fraction varying as a single-valued function of the position of the diaphragm means; and a second adjustable light attenuating means coupled to the diaphragm means for transmitting onto the second light sensor a fraction of the incident flash light, said fraction varying as a multiple-valued function of the position of the diaphragm means.

* * * * *